United States Patent
Arango

[11] Patent Number: 5,732,078
[45] Date of Patent: Mar. 24, 1998

[54] ON-DEMAND GUARANTEED BANDWIDTH SERVICE FOR INTERNET ACCESS POINTS USING SUPPLEMENTAL USER-ALLOCATABLE BANDWIDTH NETWORK

[75] Inventor: Mauricio Arango, Madison, N.J.

[73] Assignee: Bell Communications Research, Inc., Morristown, N.J.

[21] Appl. No.: 586,416

[22] Filed: Jan. 16, 1996

[51] Int. Cl.$^6$ .............................. H04L 12/46; H04L 12/66
[52] U.S. Cl. ..................... 370/355; 370/395; 370/401
[58] Field of Search ...................................... 370/352, 355, 370/389, 395, 396, 400, 401, 402, 403, 404, 410, 465, 466, 468; 395/200.02, 200.12, 200.15

[56] References Cited

U.S. PATENT DOCUMENTS

| | | | |
|---|---|---|---|
| 5,172,372 | 12/1992 | Konish | 370/401 |
| 5,179,555 | 1/1993 | Videlock et al. | 370/402 |
| 5,426,637 | 6/1995 | Derby et al. | 370/401 |
| 5,463,625 | 10/1995 | Yasrebi | 370/401 |
| 5,548,578 | 8/1996 | Matsune et al. | 370/401 |

OTHER PUBLICATIONS

L. Zhang et al., RSVP, A New Resource ReSerVation Protocol, IEEE Network, Sep. 1993.
D. Katz et al., NBMA Next Hop Resolution Protocol (NHRP), IETF draft–ietf–nhrp–07.txt.

*Primary Examiner*—Alpus H. Hsu
*Attorney, Agent, or Firm*—James W. Falk; Joseph Giordano; Loria B. Yeadon

[57] ABSTRACT

An access point 220 is provided with an access link 212 to a first host 210. The access point 220 has a first link 231 to a wide area network 230 which is the Internet backbone. Packets are communicated on the wide area network 230 using a best effort scheme at an uncontrollable, unpredictable and fluctuating rate. Neither the first host 210 nor the access point 220 are capable of selecting or controlling the rate at which packets are transmitted on the wide area network 230. The access point 220 also has a second link 261 to a guaranteed bandwidth network 260. The access point 220 is able to, on demand, establish a continuous bandwidth channel on the guaranteed bandwidth network 260 with an arbitrary other access point 240, to which another host 250 is connected, at a particular continuous packet transfer rate. The first host 210 can generate a packet requesting that the access point 220 establish a continuous bandwidth session with a second host 250. In response, the access point 220 transmits a packet via the first link 231 and the wide area network 230 to a second access point 240 to which the second host 250 is connected. The transmitted packet contains a request to set up a continuous bandwidth channel with the first host 210. The access point 220, to which the first host 210 is connected, and the second access point 240, to which the second host 250 is connected, establish a continuous bandwidth channel via the second link 261 and guaranteed bandwidth network 260. The access point 220, to which the first host 210 is connected, communicates packets between the first and second hosts 210 and 250 via the second link 261, i.e., receives packets destined to the first host 210 from, or transmits packets originating from the first host 210 to, the second link 261.

5 Claims, 3 Drawing Sheets

ON-DEMAND GUARANTEED BANDWIDTH SERVICE FOR INTERNET ACCESS POINTS USING SUPPLEMENTAL USER-ALLOCATABLE BANDWIDTH NETWORK

FIELD OF THE INVENTION

The present invention is directed to communication networks, such as the Internet, which include multiple hosts nodes, or hosts, and multiple router nodes, or routers. The present invention is particularly directed to the problem of achieving end-to-end, time-sensitive communications within predictable time intervals.

BACKGROUND OF THE INVENTION

FIG. 1 shows a conventional communications network 100. Illustratively, the communications network is the Internet. The Internet is composed of a wide area network (WAN) 110 which includes three backbone networks A, B and C. Connected to the backbone networks A, B, and C of the WAN 110 are access points a,b,c, and d. Connected to each access point a,b,c, and d are subnetworks 11, 12, 13, 14, 15 and 16 which may be local area networks (LANs) or stand alone computers. A backbone network A,B, or C is a "transit" network; normal communicated data typically neither originates nor terminates in a backbone network A, B or C. Rather, the backbone networks A, B and C typically simply transfer data from one access point a,b,c, or d to another. As shown, the backbone A is connected to access points a and b. The backbone B is connected to access points b, c and d. The backbone network C is connected to access points a and d.

The access points a,b,c, and d provide access to the WAN 110 for the subnetworks 11–16 connected thereto. Specifically, the access points a,b,c, and d receive communicated data from the subnetworks 11–16 connected thereto and transmit the data to another access point a,b,c, and d via the WAN 110. Likewise, the access points a,b,c, and d receive from the WAN 110 data destined to a subnetwork 11–16 connected thereto and transmit such data to the appropriate destination subnetwork 11–16. The access point a is connected to LANs 11 and 12 and stand alone computer 15. The access point b is connected to LAN 13 and stand alone computer 16. The access point c is connected to LAN 11 and stand alone computer 14. The access point d is connected to stand-alone computer 16.

The WAN 110 is referred to as a "wide area" network because it sprawls across remote geographic locations. Each access point a,b,c, or d is typically part of a network access provider network. Each access point is localized to a particular geographic location. The subnetworks 11–16 are typically located at a single campus of buildings and serve one enterprise. The subnetworks 11–16 may be connected to the access points a,b,c, or d by ordinary analog telephone lines, by leased digital lines (56K, T1, T3) by an ISDN network or by a cable television access network.

The Internet 100 contains nodes h1–h10, r1–r18 and as1–as4. The nodes h1–h10 are called host nodes or hosts. The hosts may originate or terminate communicate data. The nodes r1–r18 are called router nodes or routers. The routers r1–r18 do not originate or terminate communicated data in an ordinary communication. Rather, the routers r1–r18 simply receive communicated data from one node and transmit the data to another node. The nodes as1–as4 are access servers. They provide a similar function as the routers in that they typically do not originate packets but rather route them to other nodes. An access server may perform other administration functions such as controlling the admission of packets to or from specified hosts. The backbone network A includes the routers r1, r2 and r3. The backbone network B includes the routers r4, r5, r6 and r7. The backbone network C includes the routers r8 and r9. The access point a includes the router r10 and the access server as1. The access point b includes the router r12 and the access server as2. The access point c includes the router r11 and the access server as3. The access point d includes the routers r13 and r14 and the access server as4. The LAN 11 includes the hosts h1, h2 and h3 and the router r16. The LAN 12 includes the hosts h4, h5 and h6 and the routers r17 and r18. The LAN 13 includes the host h7 and the router r15. The stand-alone computer 14 includes the host h8. The stand alone computer 15 includes the host h9. The stand alone computer 16 includes the host h10.

FIG. 2 shows a block diagram of a conventional host, router or access server node 10. As shown, the node 10 may include a CPU or processor 11, a memory 12 and one or more I/O ports 13-1, 13-2, . . . , 13-N. Each I/O port 13-1, . . . , 13-N may be connected by unshielded twisted pairs of wires, coaxial cables, optical fibers, switches, satellite transponders, etc. to the I/O ports 13-1, . . . , 13-N of another node 10. The I/O ports 13-1, . . . , 13-N are for transmitting and receiving communicated data in the form of a bitstream that is organized into one or more packets (or cells). An exemplary packet 40 is shown in FIG. 3 having a header 42, which contains information for transferring the packet to its destination, and a payload 44, which carries communicated data or a communicated message to be conveyed to the destination. Packets received via the I/O ports 13-1, . . . , 13-N may be temporarily buffered in the memory 12. The processor 11 may process the packets, for instance, to determine to which node the received packets should be transmitted (as discussed below). Under control of the processor 11, the packets are transmitted according to an order specified by the processor 11 and on the appropriate I/O port 13-1, . . . , 13-N as specified by the processor 11.

A host which originates, i.e., initially generates, a packet is called a source node or source host and a host which terminates, i.e., ultimately receives, a packet is called a destination node or destination host. Communications is achieved by transferring a packet via a sequence of nodes including the source node, zero or more intermediary router (or access server) nodes, and the destination node. This sequence is called a path. The packet is transmitted between each sequential pair of nodes on the path in a bucket brigade fashion. For example, a packet may be communicated from the host node h1 to the router node r16, to the access server node as1, to the router node r10, to the router node r1, to the router node r12, to the access server node as2 and to the host node h10.

According to the Internet Protocol (IP), each node of the Internet 100 is provided with a unique address. In the above packet transfer, the source node h1 generates a packet 40 and writes in the payload 44 a message to be conveyed to the destination node h10. The source node h1 writes its IP address in a source address field of the header 42 and the IP address of the destination node h10 in a destination address field of the header 42. The host h10 then transmits the packet according to the local protocol observed in the LAN 11 (e.g., the Ethernet Protocol). The packet is received at the router r16. The router r16 uses at least one routing table stored (in the memory 12, as shown in FIG. 2) thereat to determine the next node (i.e., the node as1) on the path to the destination node h10. The following Table 1 is an example of a routing table at the router r16:

TABLE 1

| Destination Address | Next Node |
|---|---|
| 'h8' | 'as3' |
| ... | ... |
| 'h10' | 'as1' |

In Table 1, 'h8' and 'h10' are IP addresses of the nodes h8 and h10 respectively, and 'as3' and 'as1' are indications of the next node to which a packet should be routed. The router r16 uses the destination address as an index to retrieve a matching entry of the routing table (which has a matching IP address in the destination address field). The matching routing table entry contains an indication of the next node on the path to the node h10, namely, an indication of the node as1. The node r16 thus transmits the packet to the node as1. The nodes as1, r10, r1, r12 and as2 perform similar routing table look-ups using the destination address in the packet header in order to determine the next node to which the packet must be transmitted. Eventually, the packet arrives at the destination node h10.

The Internet 100 was designed to enable communication without regard to the time interval required to complete the communication from end-to-end (from source host to destination host). As a result, the Internet 100 does not provide any mechanism to the hosts h1–h10 for controlling or predicting the end-to-end time interval for completing the communication or for specifying a continuous bandwidth channel for communications. Rather, packets are transmitted according to a scheme referred to as "best effort." According to best effort packet transmission, each packet is provided the best possible communication service (i.e., lowest delay, shortest, lowest congestion path, if known, highest bandwidth link, etc.) available at each node. Best effort may be best understood by way of example. Consider the router r8 in FIG. 1. The CPU 11 (FIG. 2) at the router r8 has a finite processing speed and a buffer memory 12 of finite length. Furthermore, the links which connect the router r8 to the routers r10, r3, and r14 have a finite packet transfer rate. Consider now that multiple simultaneous communications must transmit packets via the router r8. Each time a packet is received, it is buffered in first-in, first-out order, subject to a limited amount of prioritization, prior to transmission to the next node on the respective path of the packet. The best service that can be provided to each incoming packet is subject to the instantaneous number of packets which are stored at the node r8. At times of high congestion, i.e., when more packets arrive contemporaneously than can be accommodated by the processor 11 or outgoing links, packets will be buffered for longer periods of time and incur high delays. If more packets arrive than can be stored in the buffer, some packets will be discarded and will have to be retransmitted from their source nodes resulting in even higher delays.

This presents a problem for "time-sensitive" communications, or communications which must be completed from end-to-end (source host to destination host) within a certain time. Two examples of time-sensitive communications are as follows. The first is a general communication of any kind, i.e., text, audio, video, etc., which must simply be transferred from a source host to a destination host within a time certain. A second more specific example is a streamed communication, i.e., a communication in which information must be continuously delivered within certain prescribed time limits throughout the communication. Examples of such streamed communications are pre-recorded, live and interactive video or audio communications in which information delivered from a source host to a destination host is presented (displayed on a monitor, converted to sound on a loud speaker, etc.) at the destination in real-time. In the case of streamed communications, a limited size buffer is usually provided at the destination host so that small variations in the communication rate can be tolerated. However, larger variations can cause an overflow or underflow of the buffer resulting in a humanly detectable "gap" in the presentation of video or audio. At best, such gaps are merely annoying and at worst can render the presentation of the information of the streamed communication unintelligible.

The prior art has suggested some solutions for enabling streamed or continuous bandwidth communications. A first prior art solution, called resource reservation protocol or RSVP, has been proposed by the Internet Engineering Task Force. See L. Zhang et al., *RSVP, A New Resource Reservation Protocol*, IEEE NETWORK, Sept. 1993. According to RSVP, each of the routers on a path between the source host and the destination host is adapted according to the RSVP protocol. As the name suggests, a continuous bandwidth channel is set up by transmitting a control packet from the source node to the destination node on a path through the Internet 100. As the control packet arrives at each router (or access server) on the path, the router (or access server) responds to the control packet by reserving a sufficient amount of bandwidth at the router (or access server) so as to guarantee a requisite amount of bandwidth for the communication. Once the path is set up, the source node transmits its packets on the path to the destination node. In reserving bandwidth, each router (or access server) implements an admission control scheme, under which packets of other communications in excess of the unreserved bandwidth are discarded or prevented from being received at the router (or access server) so as to satisfy the bandwidth reservation of the streamed communication.

The problem with RSVP is that there are tens of thousands of routers (and access servers) in the Internet 100 which must be adapted according to RSVP, including routers and access servers owned by network access provider networks, routers owned by the owners of the backbone networks and routers in private networks. Thus, RSVP is not very amenable to incremental implementation. Rather, it must be deployed in a significant portion of the Internet 100. Such massive deployment will be delayed until RSVP gains wide-spread approval.

The IETF has also proposed a second solution referred to as Next Hop Resolution Protocol (NHRP) in D. Katz et al., *NBMA Next Hop resolution Protocol (NHRP)*, IETF draft-ietf-rolc-nhrp-07.txt. This solution has been proposed by the Routing Over Large Clouds (ROLC) working group of the IETF.

FIG. 4 shows a "Classical IP over ATM" network in which the NHRP has been proposed. As shown, hosts H1, H2, H3, H4 and H5 and routers R1 and R2 are connected to an ATM network 150. The host H1–H5 and routers R1–R2 are organized into "logical IP subnetworks" (LISs). Specifically, the hosts H1 and H2 and router R1 are organized into LIS 152, the hosts H3 and H4 and routers R1 and R2 are organized into LIS 154 and the host H5 and router R2 are organized into LIS 156. An LIS 152, 154 or 156 defines an administrative domain. Direct connections may only be established amongst hosts within the same LIS, e.g., between the hosts H3 and H4 in the LIS 154. Ordinarily, in order to communicate between hosts in different LISs, e.g., the host H1 in LIS 152 and the host H5 in LIS 156, multiple connections must be established. For instance, the host H1 may establish a connection with the router R1. The router R1 may establish a connection with the router R2. The router R2 may establish a connection with the host H5. Packets then traverse from the host H1 to the router R1, to the router R2 and then to the host H5.

NHRP proposes to reduce the multiple connections for inter-LIS communications as follows. Each host H1-H5 and router R1-R2 is adapted according to NHRP. Specifically, each host is assigned a "next hop server," e.g., the router R1 is assigned as the next hop server for the hosts H1 and H2, and the router R2 is assigned as the next hop server for the hosts H3, H4 and H5. The routers R1 and R2 are adapted so that they can translate their assigned hosts IP addresses to their respective ATM addresses. The hosts are adapted as follows. When an adapted host, e.g., the host Hi, decides to set up a direct connection with another host, e.g., the host H5, the host H1 transmits to its assigned next hop server, i.e., router R1, a packet requesting translation of the IP address of the host H5 to its ATM address. If the destination node H5 is assigned to a different next hop server, the router R1 forwards the packet to the next node on the path to the destination node Hi, i.e., the router R2. This "forwarding" of the request packet is repeated until the packet arrives at a next hop server which can translate the IP address of the destination node H5 to its ATM address. When the request packet arrives at a next hop server which can perform the requested translation, i.e., the router R2, the next hop server R2 transmits a packet containing the requested translation (i.e., ATM address of the host H5) via the reverse path traversed by the request packet. The packet arrives at the source node H1 which uses the ATM address therein to establish a direct connection with the destination host H5.

The problem with NHRP is that it requires changing the entire Internet architecture to an ATM or other suitable switched network architecture (such as ISDN, X.25, etc.) Indeed, even the hosts must be retrofitted with ATM I/O interface hardware. Second, in NHRP, the decision to initiate setting up a direct connection is not necessarily made by the hosts. Consider the case where the host H6, which has no direct connection capability, is to communicate streamed information to the hosts H4. According to NHRP, the decision to initiate setting up the direct connection may be made by the router R2 and not the host H6. This may not yield the most desirable outcome since it is the applications executing on the hosts H6 and H4 which have the greatest knowledge regarding the specific resource needs (i.e., quality of service, bandwidth, etc.) of the streamed communication.

A third solution has been proposed for enabling streamed communications. Referring to FIG. 5, a simplified diagram of the Internet 100 is shown with access points a and b and subnetworks 11 and 12. Also shown is a switched network 175 such as an ISDN or ATM. The switched network 175 is capable of setting up a continuous bandwidth channel of a bandwidth that may be user-selectable. Both subnetworks are provided with a special on-demand router r21 or r22 that is capable of establishing a continuous, user-definable bandwidth channel using the switched network 175. When a source host, e.g. ,the host h1, desires to communicate streamed information, the host h1 transmits a request packet via the Internet 100 to the host h7, i.e., via the path h1→r16→access point α→WAN 110→access point b→r15→h7. The request packet includes a request for initiating a continuous bandwidth communications session using the switched network 175 and the requisite bandwidth for the communication. In response, the host h7, if it agrees to engage in the communication session, responds to the request via the Internet 100. In this fashion, the hosts h1 and h7 "negotiate" the setting up of a continuous bandwidth channel for the communications session using the switched network 175. Amongst other things, the hosts h1 and h7 can exchange IP and switched network addresses for their routers r21 and r22, negotiate which of the two subnetworks will set up the channel on the switched network 175, which subnetwork will pay for the communication on the switched network 175 and other issues regarding security, etc. Assume the host h1 is to set up the communications channel on the switched network 175. The host h1 modifies its routing table so as to route streamed communication packets, destined to the host h7, to the router r21. Furthermore, the host h1 uses the IP and switched network address of the router r22 to modify the routing table of the router r21 so as to route streamed communication packets originating at the host h1 and destined to the host h7 via the switched communications network 175. Likewise, the host h7 modifies its routing table so as to route streamed communication packets, destined to the host h1, to the router r22. Furthermore, the host h7 uses the IP and switched network address of the router r21 to modify the routing table of the router r22 so as to route streamed communication packets originating at the host h7 and destined to the host h1 via the switched communications network 175. The host h1 then instructs the router r21 to establish a communication channel with the router r22 using the switched network address of the router r22. The packets are then transmitted from the host hi to the router r21 to the switched network 175 to the router r22 and to the host h7. Likewise, packets are transmitted from the host h7 to the router r22 to the switched network 175 to the router r21 and to the host h1.

The solution depicted in FIG. 5 is robust in that the WAN 110 need not be modified. In addition, the switched network 175 is readily available and can accommodate the above scheme. Note that the signalling protocol of the switched network (i.e., Q.931 for ISDN and Q.2931 for ATM) is used only to set up a channel of a specified bandwidth. All other preliminary negotiations are carried out using the Internet 100.

However, the solution of FIG. 5 does present problems. Specifically, all subnetworks which desire to engage in continuous bandwidth communications must purchase new on-demand routers and on-demand router software capable of operating in accordance with the above scheme. Subnetwork administrators may be reluctant to accept the responsibility of administering the on-demand routers. In any event, personnel must be trained at each subnetwork in the administration of such on-demand routers. Second, the cost of such on-demand routers or on-demand router software may be too prohibitive for all subnetworks, especially, the stand alone computer networks. (Note that both the source and destination subnetworks must be retrofitted with on-demand routers.) Third, note that not all communications from the subnetwork will be streamed communications. Thus, the on-demand router may be idled for long periods of time when only time-insensitive communications are desired at a subnetwork.

It is an object of the present invention to overcome the disadvantages of the prior art.

SUMMARY OF THE INVENTION

This and other objects are achieved by the present invention. An illustrative environment of use of the present invention is the Internet. In the Internet, communication is achieved by transmitting a bitstream that is organized into packets. The Internet comprises a number of backbone networks, access points and subnetworks. The subnetworks include at least one host node which originates, i.e., generates, or terminates, i.e., ultimately receives, packets. Each backbone network and each access point include one or more routers for receiving packets destined to a destination host node and for transmitting the received packets on a path, i.e., sequence of nodes, to the destination host node. The backbone networks form a wide area network for transmitting packets between pairs of access points. Each access point is connected to a subset of the subnetworks for purposes of communicating packets via the wide area network to subnetworks connected to other access points. The wide area network transfers packets at a fluctuating and non-specifiable rate and over an unpredictable time interval-neither the access points nor the subnetworks can allocate a continuous bandwidth channel for transmitting packets on the wide area network.

According to one embodiment, an access point is provided with an access link connected to a first host. The access point has a first link to the wide area network. Packets are communicated on the wide area network using a best effort scheme at an arbitrary and fluctuating rate and over an unpredictable time interval. Neither the first host nor the access point is capable of selecting or controlling the rate at which packets are transmitted on the wide area network or the time interval required to complete a communication from end to end. The access point also has a second link to a guaranteed bandwidth network. The access point is able to, on demand, establish a continuous bandwidth channel on the guaranteed bandwidth network with an arbitrary other access point, to which another host is connected, at a particular continuous packet transfer rate. The first host can generate a packet requesting that the access point establish a continuous bandwidth session with a second host. In response, the access point transmits a packet via the first link and the wide area network to a second access point to which the second host is connected. The transmitted packet contains a request to set up a continuous bandwidth channel with the first host. The access point, to which the first host is connected, and the second access point, to which the second host is connected, establish a continuous bandwidth channel via the second link and guaranteed bandwidth network. The access point, to which the first host is connected, communicates packets between the first and second hosts via the second link, i.e., receives packets originating from the second host and destined to the first host from, or transmits packets originating from the first host and destined to the second host to, the second link.

The access point is illustratively provided with a first router for routing packets onto the first link and for receiving packets from the first link. The access point also has a second router for routing packets onto the second link and for receiving packet from the second link. The access point also has an access server for receiving packets originating from the first host and for routing the packets originating from the first host to the first router or the second router. The access server illustratively is also for routing packets received from the first and second routers to the first host. The access point furthermore has a second server called an on-demand guaranteed bandwidth (OGB) server. Illustratively, the OGB server is for modifying a routing table at the first access server so as to cause the first access server to route at least some of the packets originating from the first host, and destined to the second host, to the second router. Illustratively, the OGB server is also for modifying a routing table at the second router so as to cause the second router to route only packets received from the second host, and destined to the first host, to the access server.

In an alternative embodiment, the OGB server is connected between the access server and the two routers. The routers transfer all packets received from the first and second links to the OGB server. The OGB server transfers the received packets to the access server. The access server transfers all packets received from the first host to the OGB server. The OGB server modifies its routing table so as to route only those packets originating from the first host, and destined to the second host, via the second router. The OGB server routes all other packets received from the access server via the first router.

Another aspect of the invention pertains to selective routing of some packets from a source node to a destination node via the wide area network and other packets from the same source node to the same destination node via the guaranteed bandwidth network. This aspect of the invention is applicable to both embodiments described. Furthermore, this aspect of the invention can apply to a network where the subnetworks, themselves, which contain the source node and the destination node are connected to the guaranteed bandwidth network.

According to this aspect of the invention, the source node of the communications network has multiple applications executing thereon. A first application communicates time-sensitive information, and at least one other application communicates time-insensitive information, to the destination node. Two paths are established between the source node and the destination node. A first path includes a first node connected to the guaranteed bandwidth network and a second path includes a second node connected to the wide area network. The following steps are carried out to ensure that only the packets issued by the first application to the destination node are transmitted via the guaranteed bandwidth network. A routing table of a certain node, which precedes the first node on the first path and which precedes the second node on the second path, is modified. In particular, the modification causes packets, containing the destination address of the destination node and the application port number corresponding to the first application executed by the source node, to be routed to the first node. All other packets comprising the destination address of the destination node, which originate from the source node, are routed to the second node. The first node routes the packets via a continuous bandwidth channel of the guaranteed bandwidth network to the destination node. The second node, using a best effort scheme, at an arbitrary and fluctuating rate (which neither the source node, the destination node, the second node or the certain node that precedes the second node can control), routes its packets via the wide area network to the destination node.

In the case that the guaranteed bandwidth network is connected to an access point to which the source node is connected, the certain node which precedes the first and second nodes on the first and second paths can be an access server or an OGB server. In the case that the guaranteed bandwidth network is connected to a router of the subnetwork containing the source node, the certain node can be the source node itself.

In short, an access point architecture is provided for enabling time-sensitive communications between hosts to be achieved, end-to-end, within a predictable time interval. The access point, of a host that desires to establish a time-sensitive communication with a second host, communicates with a second access point of the second host via the Internet backbone. The two access points then set up a continuous bandwidth channel via a supplementary guaranteed bandwidth network which bypasses the Internet backbone. The present invention thus achieves the goal of time-sensitive communications, from end-to-end, within a predictable time interval, while minimizing costs and administrative burdens.

DETAILED DESCRIPTION OF THE INVENTION

Figure 1:
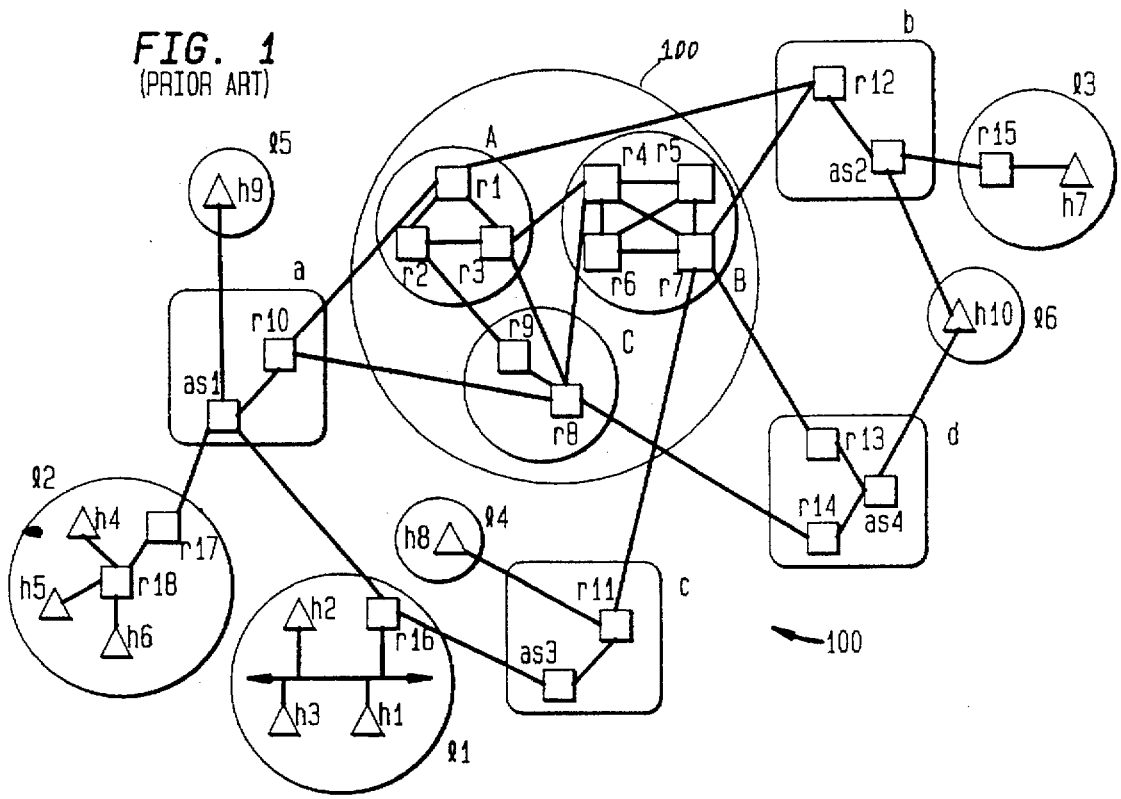
FIG. 1 shows a conventional Interact.
Figure 2:
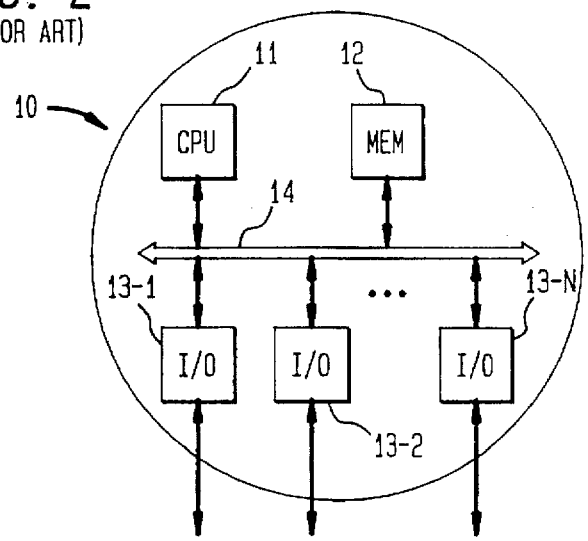
FIG. 2 shows a conventional node.
Figure 3:
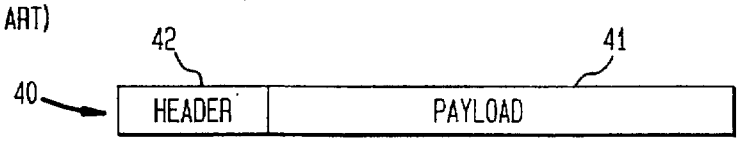
FIG. 3 shows a conventional packet.
Figure 4:
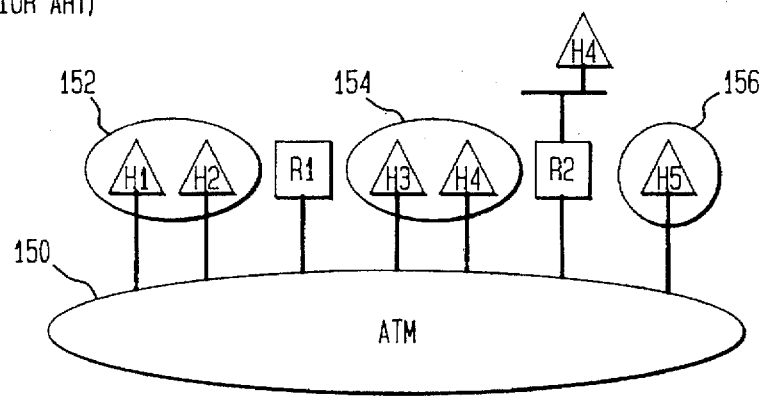
FIG. 4 shows a first prior art network architecture for providing continuous bandwidth communication.
Figure 5:
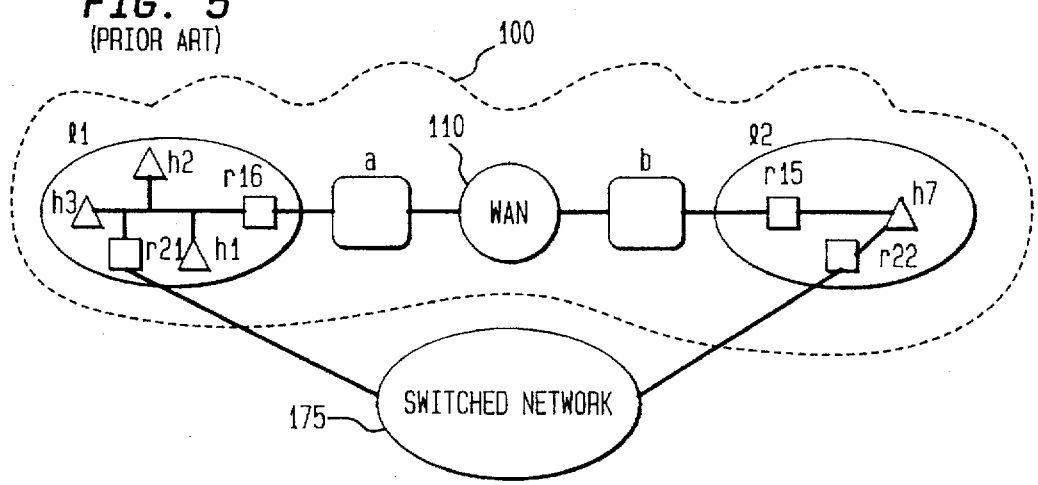
FIG. 5 shows a second prior art network architecture for providing continuous bandwidth communication.
Figure 6:
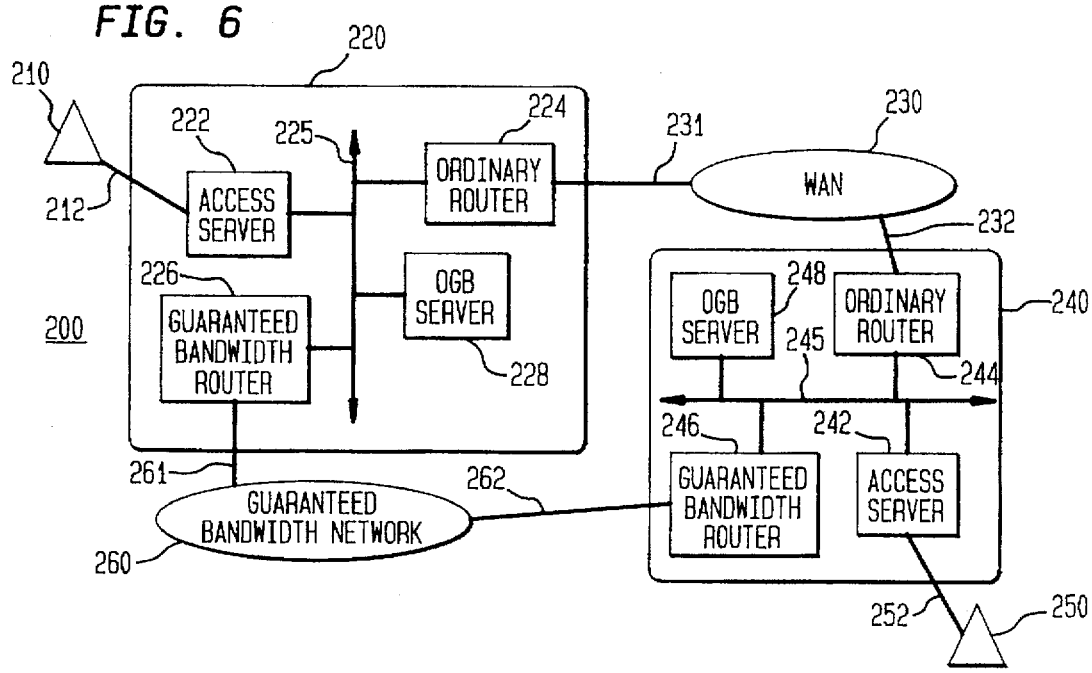
FIG. 6 shows a time-sensitive communication network architecture according to an embodiment of the present invention.

FIG. 6 shows a network architecture 200 according to an embodiment of the present invention. As in FIG. 1, the network architecture 200 has a first host 210 which is connected to a first access point 220. For sake of convenience, the first host 210 is shown as a stand alone computer although the first host may be part of a LAN subnetwork (and connected to the access point 220 via a router of its LAN subnetwork). The access point 220 is connected to a WAN 230 via a communications link 231. The WAN 230 illustratively includes plural backbone networks and forms the Internet backbone. Also connected to the WAN 230, via a communication link 232, is a second access point 240. The second access point 240 is connected to a second host 250. The hosts 210, 250, access points 220 and 240 and WAN 230 form part of the Internet.

Also shown is a guaranteed bandwidth network 260. The first access point 220 is connected to the guaranteed bandwidth network 260 via a link 261. The second access point 240 is connected to the guaranteed bandwidth network 260 via a link 262. The guaranteed bandwidth network 260 may be a switched network such as an ISDN network or an ATM network. Illustratively, the access points 220 and 240 can, on demand, set up and tear down communication channels on the guaranteed bandwidth network having a particular predefined or selected bandwidth. Once set up, the guaranteed bandwidth network 260 provides a communications channel which is guaranteed to have the predefined or selected bandwidth continually during the session.

As noted above, the same is not true for the WAN 230. The access points 220 and 240 can communicate on the WAN 230. However, there are no guarantees of continuous bandwidth. Rather, communications on the WAN 230 are best effort, i.e., the best service which is instantaneously available is provided to the communications.

The access point 220 has an access server 222, an ordinary router 224, a guaranteed bandwidth router 226 and an on-demand guaranteed bandwidth (OGB) server 228. All of these devices 222, 224, 226 and 228 are connected via a LAN 225. The access provider 222 is connected to the host 210 via an access link 212. Illustratively, the access link 212 can be an analog telephone line, an ISDN line, a leased digital line or a cable television network link. The router 224 is connected to the WAN 230 via the link 231. The router 226 is connected to the guaranteed bandwidth network 260 via the link 261. Note that the devices 222, 224, 226 and 228 form an abbreviated block diagram of the access point 220. The access point 220 typically has multiple ordinary routers 224 and links 231 to the WAN 230 and may have multiple access servers 222, multiple OGB servers 228, multiple guaranteed bandwidth routers 226 and multiple links 261 to one or more guaranteed bandwidth networks 260.

Likewise, the access point 240 has an access server 242, an ordinary router 244, a guaranteed bandwidth router 246 and an OGB server 248. The devices 242, 244, 246 and 248 are connected via a LAN 245. The access server 242 is connected to the host 250 via an access link 252. Illustratively, the access link 250 can be an analog telephone line, an ISDN line, a leased digital line or a cable television network link. The router 244 is connected to the WAN 230 via the link 232. The router 246 is connected to the guaranteed bandwidth network 260 via the link 262. Like the access point 220, the access point 240 typically has multiple ordinary routers 244 and links 232 to the WAN 230 and may have multiple access servers 242, multiple OGB servers 248, multiple guaranteed bandwidth routers 246 and multiple links 262 to one or more guaranteed bandwidth networks 260.

In the absence of the invention, ordinary communications are achieved as follows. The host 210 transmits a packet destined to the host 250 via the link 212 to the access server 222. The access server 222 contains a buffer for temporarily storing received packets prior to transmission from the access point 220, a memory for storing one or more routing tables, and a processor. The access server 222 temporarily stores the received packet in the buffer. The processor of the access server 222 then uses the destination address of the packet to access a routing a table stored thereat. The routing table indicates the next node to which the packet should be transmitted. In accordance with this indication, the access server 222 outputs the packet to the appropriate ordinary router 224 for output via the WAN 230. The packet may be temporarily stored in a buffer of the router 224 pending transmission on the correct link. The packet is then transmitted on the appropriate link 231 to a node in the WAN 230.

Likewise, a packet received from the WAN 230 via a link 232 is received at the ordinary router 244 of the access point 240. This packet may be temporarily buffered in the ordinary router 244. The packet is then transferred to the access server 242 where it is temporarily stored in a buffer therein pending routing. Like the access server 222, the access server 242 has a memory for storing one or more routing tables and a processor. The processor of the access server 242 accesses a routing table stored thereat using the destination address of the received packet as an index to determine the next node to which the packet must be transmitted. In this case, the processor determines that the packet must be transmitted to the host 250. The access server 242 therefore transmits the packet via the link 252 to the host 250 where it is received.

According to an embodiment of the invention, the hosts 210 and 250 execute ordinary World Wide Web (Web) browser software. The OGB servers 228 and 248 execute Web server software which can be accessed by the host 210 or host 250, respectively, using the Web browsers executing thereat. Suppose the host 210 wishes to initiate a time-sensitive communication session with the host 250. Using the Web browser software executing thereon, an application executing on the host 210 provides the IP address of the host 250 and the bandwidth of the communication to the Web server software executing at the OGB server 228. Illustratively, this is achieved by the Web browser software transmitting to the OGB server 228 one or more messages in one or more packets requesting the initiation of a time-sensitive communication session with the host 250. In response, the OGB server 228 first determines if resources (e.g., bandwidth) are available for accommodating the requested communication. If so, the OGB server 228 transmits a message packet via the ordinary packet router 224, the link 231 and WAN 230 to the host 250. The message packet includes the IP address of the host 250 in the destination address of the packet and a message requesting initiation of a time-sensitive communication session. Illustratively, the message packet includes the IP and guaranteed bandwidth network addresses of the router 226. The message packet may also indicate: the kinds of guaranteed bandwidth networks 260 to which the access point 220 can connect, a preferred guaranteed bandwidth network 260, a preferred bandwidth or quality of service, a preference as to which of the hosts 210 or 250 will pay for the session, a preference as to which of the hosts 210 or 250 will initiate the connection, terms regarding security or public key exchange for encryption, etc.

The message packet is received at the ordinary router 244. The ordinary router 244 outputs the packet to the access server 242 which transmits the packet to the host 250. Illustratively, the host 250 has an OGB process executing thereon which responds to message packets requesting initiation of communications sessions. The host 250 may respond by transmitting a message packet back to the OGB server 228 via the link 252, access server 242, router 244, link 232, WAN 230, link 231, router 224 and bus 225. Illustratively, the message packet transmitted back to the OGB server 228 simply contains the IP address of the OGB server 248 and a message indicating that all messages regarding setting up the communication session should be transmitted to the IP address of the OGB server 248. In response, the OGB server 228 retransmits its message packet to the OGB server 248 via the WAN 230. (In so doing, the OGB server 228 writes in the destination address field of the message packet, the IP address of the OGB server 248 prior to transmission). Advantageously, however, the OGB process executing on the host 250 simply forwards the request packet received from the OGB server 228 to its OGB server 248. The OGB server 248 then responds as described below. Note that the OGB server 228 will receive a packet in response to its request packet from the OGB server 248 (the source address of the response packet will contain the IP address of the OGB server 248 in the source field.) Illustratively, the OGB server 228 recognizes that the respondent to its request packet has a different IP address than the address to which the OGB server 228 originally transmitted its request packet. As a result, the OGB server 228 can transmit future packets for setting up the communication channel directly to the OGB server 248 rather than to the host 250.

Through either scheme described above, the request packet is received at the OGB server 248. The OGB server 248 examines the request packet and determines whether or not the request can be accommodated. For instance, the access point 240 may not have access to the same guaranteed bandwidth network 260 as the access point 220. Alternatively, the access point 240 may not have sufficient bandwidth to accommodate the time-sensitive communication requested by the packet. In yet another scenario, the OGB server 248 may restrict time-sensitive communications so that they can only be provided to specific hosts or from specific hosts. In response to the message packet, the OGB server 248 may transmit a packet back which: (a) rejects the request, (b) accepts the request, or (c) offers to negotiate the request. If option (c) is pursued, all of the items which can be specified in the message packet transmitted from the OGB server 228 can be specified in the message packet transmitted from the OGB server 248. The OGB server 248 writes the IP address of the OGB server 228 in the destination address of the packet and the message in the payload of the packet. The OGB server 248 then transmits the packet back to the OGB server 228 via the WAN 230. Several message packets may be transmitted back in forth between the OGB servers 228 and 248 via the WAN 230 in negotiating the terms of the session.

Assume that an agreement eventually is reached. Suppose the OGB server 228 is to initiate the time-sensitive communications session which is a two-way time-sensitive communication session. At some point in the negotiation, the OGB server 248 transmits a message packet containing the guaranteed bandwidth network address and IP address for the guaranteed bandwidth router 246. In response, the OGB server 228 modifies the routing tables of the access server 222 so as to cause the access server 222 to route packets originating from the host 210, and destined to the host 250, to the guaranteed bandwidth router 226. For example, Table 2 illustrates the routing table at the access server prior to the modification and Table 3 illustrates the routing table at the access server 22 after the modification:

TABLE 2

| Destination Address | Next Node |
|---|---|
| ... | ... |
| 'host 250' | 'router 224' |
| ... | ... |

TABLE 3

| Source and Destination Address | Next Node |
|---|---|
| ... | ... |
| 'host 250' | 'router 224' |
| 'host 210, host 250' | 'router 226' |

In Tables 2 and 3 'host 250' is the IP address of the host 250, 'host 210, host 250' is the combination of the IP addresses of the host 210 and the host 250, 'router 224' is an indication to route the packet to the router 224 and 'router 226' is an indication to route the packet to router 226. Both source and destination addresses are used in the modified routing table to ensure that only packets destined to the host 250 and originating at the host 210 are routed to the router 226.

The OGB server 228 then instructs the guaranteed bandwidth router 226 to set up a communication channel of a specified, continuous bandwidth (as agreed during the negotiations above) to the guaranteed bandwidth router 246 using the guaranteed bandwidth address obtained from the OGB server 248. The OGB server 228 also modifies the routing table of the guaranteed bandwidth router 226 so as to route packets originating from the host 210 and destined to the host 250 to the router 246 and to transmit such packets on the channel thus opened. The OGB server 228 also modifies the router 226 routing table so as to route to the access server 222 packets received on the same channel from the host 246 originating at the host 250 and destined to the host 210.

During the negotiations, the OGB router 248 receives a message packet from the router 228 (via the WAN 230)

indicating the IP address of the guaranteed bandwidth router 226. In response, the OGB router 248 modifies the routing table of the access server 242 to route packets originating from the host 250 and destined to the host 210 to the guaranteed bandwidth router 246. The OGB server 228 also modifies the routing table of the guaranteed bandwidth router 246 so as to route packets originating from the host 250 and destined to the host 210 to the router 226 and to transmit such packets on the channel opened by the guaranteed bandwidth router 226. The OGB server 228 also modifies the router 246 routing table so as to route to the access server 242 packets received on this channel from the host 226 originating from the host 210 and destined to the host 250.

The host 210 may then transmit packets containing time-sensitive data. The packets are received at the access server 222 which routes them to the guaranteed bandwidth router 226. The router 226 transmits the packets on the appropriate channel of the guaranteed bandwidth network 260 to the router 246.

The packets are received at the guaranteed bandwidth router 246. The router 246 routes the packets to the access server 242. The access server 242 then routes the packets to the host 250.

An analogous procedure is carried out for time-sensitive communication in the opposite direction. The host 250 transmits packets containing time-sensitive data. The packets are received at the access server 242 which routes them to the guaranteed bandwidth router 246. The router 246 transmits the packets on the appropriate channel of the guaranteed bandwidth network 260.

The packets are received at the guaranteed bandwidth router 226. The router 226 routes the packets to the access server 222. The access server 222 then routes the packets to the host 210.

When it is desired to close the session, the host desiring to close the session, e.g., the host 210, transmits a message packet indicating such a desire to its OGB server, e.g., the OGB server 228, using its Web browser. In response, the OGB server 228 transmits, via the channel of the guaranteed bandwidth network 260, to the other OGB server 248, a message packet indicating the close of the session. The OGB server 228 then instructs the guaranteed bandwidth router 226 to close the channel/tear down the communication session via the guaranteed bandwidth network 260. The OGB server 228 then resets the routing tables of the router 226 and access server 222. Likewise, in response to receiving the message packet from the OGB server 228, the OGB server 248 instructs the router 246 to tear down the communications session on the guaranteed bandwidth network 260. The OGB server 248 then resets the routing tables at the router 246 and access server 242. The OGB server 248 also transmits an appropriate packet to the host 250 indicating that the host 210 terminated the communications session.

Thus, the access points contain a connection to the guaranteed bandwidth network and a connection to the Internet backbone (best effort wide area network). The access points perform the negotiation for setting up the guaranteed, continuous bandwidth communication by exchanging packets via the Internet backbone. The access point performs the IP-to-guaranteed bandwidth network address translation. The access points also establish the guaranteed continuous bandwidth channel on the guaranteed bandwidth network. Furthermore, the access points perform the re-routing of selected guaranteed bandwidth packets, so that they are transmitted via the guaranteed bandwidth channel, and route packets received from the guaranteed bandwidth channel to the appropriate host connected thereto. This provides a number of advantages:

(1) The administration of the IP-to-guaranteed bandwidth network address translation is administered by the network access provider. The network access provider is in the business of managing networks and is more amenable to accept and take on the administration responsibility. The network access provider also possesses trained network technicians for repairing, trouble-shooting and enhancing the operation of the access point and the guaranteed bandwidth routing.

(2) Efficient use of bandwidth and communications channels on the guaranteed bandwidth network is achieved. Note that the access points can have far less bandwidth or far fewer channels than the total aggregate bandwidth or channels needed to service the time-sensitive communications of each subnetwork simultaneously. This is because the likelihood that all subnetworks will initiate simultaneously a time-sensitive communication session is low. Thus, the guaranteed bandwidth communication facilities are time-shared amongst multiple subnetworks.

(3) The number of on-demand routers which must be purchased is minimized. This follows for reasons analogous to those mentioned in (2). Furthermore, on-demand routers may be provided which can accommodate multiple simultaneous guaranteed bandwidth channels.

(4) No modifications need be made to the WAN 230 or to even all access points. Only those access points that wish to provide guaranteed bandwidth service need be modified.

(5) Ordinary communications via the WAN 230 between nodes remain unaffected by the invention.

(6) The guaranteed bandwidth network is readily available and the invention can be quickly and easily deployed. Furthermore, routers are available which can make single, predetermined direct connections via ISDN (and are currently used to establish high bandwidth connections, such as on the link 212, between hosts 210 and access points 220). Such routers provide the necessary software interfaces for establishing arbitrary connections to any other ISDN address.

Figure 7:
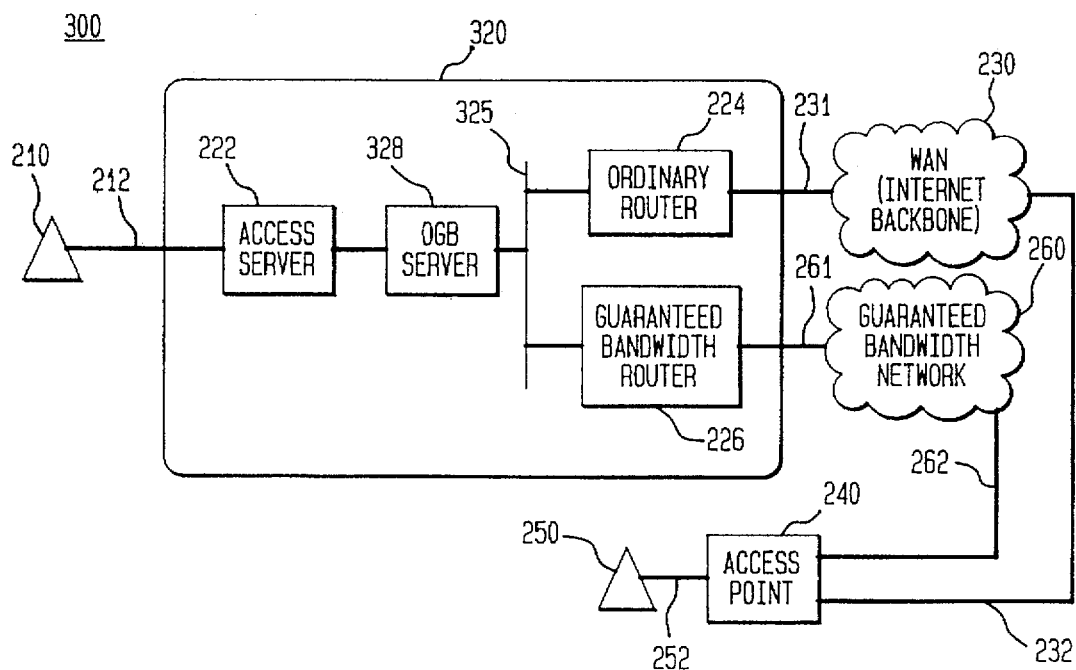
FIG. 7 shows a second time-sensitive communication network architecture according to an embodiment of the present invention.

FIG. 7 shows an alternative access point architecture. The network architecture 300 is shown as before with host 210 connected via an access link 212 (analog telephone line, ISDN line, leased digital line, cable television network link, etc.) to an access point 320. The access point 320 is connected via an access link 231 to best effort WAN 230 (which is the Internet backbone) and to a guaranteed bandwidth network 260 via link 261. Likewise, host 250 is connected via an access link 252 to access point 240. Access point 240 is connected via link 232 to the WAN 230 and via link 262 to guaranteed bandwidth network 260.

The access point 320 has similar devices as the access point 220 in FIG. 6. In particular, the access point 320 has an access server 222, and OGB server 328, an ordinary router 224 and a guaranteed bandwidth router 226. The access server 222 communicates packets to and from the host 210 via the access link 212. The ordinary router 224 communicates packets to and from the WAN 230 via the link 231. The guaranteed bandwidth router 226 communicates packets to and from the guaranteed bandwidth network 260 via the link 261. Unlike the access point 220 of FIG. 6, however, the devices 222, 224, 226 and 328 are not connected to a common LAN. Rather, the OGB server 328 is connected between the access server 328 and the routers 224 and 226 (which may be connected to a common LAN 325).

Ordinary packet communication in the access point 320 proceeds as follows. A packet originating from the host 210 is received at the access server 222. The access server 222 transmits the packet to the OGB server 328. The OGB server 328 examines the packet and determines that the packet is part of an ordinary time-insensitive packet communication. As such, the OGB server 328 transmits the packet to the router 224. The router 224 transmits the packet to the WAN 230. Likewise, when the router 224 receives a packet from the WAN 230, the router 224 transmits the packet to the OGB server 328, which transmits the packet to the access server 222. The access server 222 transmits the packet to the host 210.

In a time-sensitive communication, the host 210 may generate a packet requesting initiation of a time-sensitive communication (e.g., with the host 250). This packet is received at the access server 222 which simply routes the packet to the OGB server 328. The OGB server 328 can determine if such a communication is appropriate for the node 210. Afterward, the OGB server 328 transmits the packet to the router 224 for transmission to the WAN 230. Negotiations would then proceed as described above.

Assume now that a message packet is received from the WAN 230 requesting initiation of a time-sensitive communication session. The message packet is received at the router 224 which transmits the packet to the OGB server 328. The OGB server 328 examines the packet and determines that the packet is requesting a time-sensitive communication. In response, the OGB server 328 may reject, accept or negotiate the request.

Assume now that an agreement is reached and that the OGB server 328 is to set up the communications channel. At some point during the negotiations, the IP address and guaranteed bandwidth network address of the guaranteed bandwidth router of the other access point (e.g., the router 246 of the access point 240) are transmitted in a message packet via the WAN 230 to the OGB server 328. Using the guaranteed bandwidth network address of the access point (e.g., the access point 240), the OGB server 328 instructs the guaranteed bandwidth router 226 to set up a communications channel with a particular desired and continuous bandwidth. The OGB server 328 also modifies the routing table of the router 226 so as to route to the router 246 via the channel thus opened, packets originating from the host 210 and destined to the host 250.

The OGB server 328 then modifies its own routing tables as follows. The OGB server 328 modifies its routing tables such that packets originating from the host 210 and destined to the host 250 are muted to the appropriate guaranteed bandwidth router 226.

Consider the case where the host 210 transmits a time-sensitive information bearing packet. This packet is received at the access server 222 which simply transmits the packet to the OGB router 328 as usual. The OGB server 328, using its modified routing table, transmits the packet to the appropriate guaranteed bandwidth router 226. Using the modified routing table, the router 226 then transmits the packet on the indicated channel of the guaranteed bandwidth network 260 to the router (i.e., the router 246) of the access point 240.

Consider now the case where a packet is received from the host 250 that is destined to the host 210 via the respective channel of the guaranteed bandwidth network 260. The router 226, using its modified routing table, transmits the packet to the OGB server 328, which transmits the packet to the access server 222. The access server 222 then transmits the packet to the host 210.

The architecture of the access point 320 provides several advantages. First, the routing tables in the access server 222 need not be modified to achieve the time-sensitive communication. Second, greater security is afforded, since the OGB server 328 has an opportunity to examine each packet as it flows between the host side equipment (i.e., the access server 222) and the network side equipment (i.e., the routers 224 and 226). On the other hand, the architecture of the access point 320 can also present a bottleneck to the flow of packets between the host side and the network side equipment if the volume of traffic exceeds the processing capacity of the OGB server 328. Such a bottle neck is not present in the architecture shown in FIG. 6.

Figure 8:
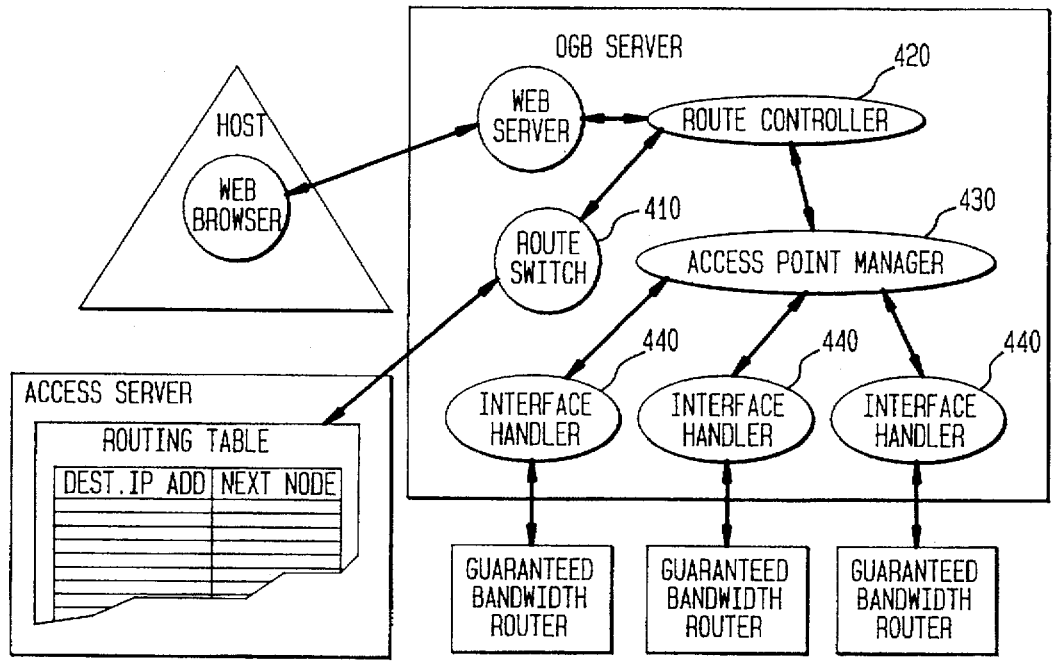
FIG. 8 shows the software architecture for the access point depicted in FIG. 6.

FIG. 8 shows the relationship of various procedures executed in the OGB server 228, 248 (FIG. 6) or 328 (FIG. 7) and the user interface (Web browser) in the hosts 210, 250 (FIG. 6) and routing tables in the access servers 222, 242 (FIG. 6) and guaranteed bandwidth routers 226, 246 (FIG. 7). As shown, the OGB server executes a route controller agent procedure 420, a route switch agent procedure 410, an access point manager procedure 430 and one or more interface handler procedures 440. The function of each procedure is discussed below.

The route controller agent 420 receives requests for initiating time-sensitive communications. These requests are provided by the Web server executing on the OGB server, which in turn receives them from the Web browsers executing in hosts that are local to the access point containing the OGB server. Each request for a time-sensitive communication issued by an application must include the destination IP address of the host with which the time-sensitive communications is to be conducted and the required bandwidth of the communications. In response to the request, the route controller agent 420 first determines, in conjunction with the access point manager 430, whether or not the access point has sufficient resources (e.g., bandwidth) to accommodate the requested communication. If there are sufficient resources, the route controller agent 420 commences the negotiations as described above regarding, which host pays for the connection, which access point sets up the communication channel, security, etc. Specifically, the route controller agent 420 transmits a request packet to the OGB process executed by the host with which the time-sensitive communication is to be established. Illustratively, the OGB process executed by that host transmits the request to the route controller agent 420 executing on its assigned OGB server.

The route controller agent 420 also receives requests to establish a time-sensitive communication, which requests originate from another route controller agent 420. As noted above, the route controller agent 420 can perform source based acceptance and rejection. That is, the route controller agent 420 can outright reject requests from certain sources or reject requests not made by a selected list of sources. If the request is not rejected outright, the route controller agent 420 may perform similar functions described above, when the request is generated by a local application. That is, the route controller agent 420 may inquire of the access point manager 430 whether there are sufficient resources to accommodate such a request. The route controller agent 420 may also consult locally stored information regarding the policy of payment, security and other issues in determining whether or not to accept the request. The route controller agent 420 may accept the request, reject the request or negotiate the request, e.g., submit a counter proposal.

When agreement is reached, the route controller agent 420 obtains the IP address and the address on the guaranteed bandwidth network, of its guaranteed bandwidth router to be used in establishing the continuous bandwidth channel. The route controller agent 420 transmits such information to the route controller agent 420 on the far (other) end of the communication channel to be established.

If the route controller agent 420 is to set up the communication, the route controller agent 420 instructs the access point manager 430 to set up the channel. The route controller agent 420 provides the IP address, and guaranteed bandwidth network address of the router to be contacted at the far end of the communication. The route controller agent 420 also instructs the route switch agent 410 to reroute packets having certain source and destination addresses via an appropriate one of the guaranteed bandwidth routers at the local end of the communication for transmission via the guaranteed bandwidth network to the far end of the communication. The route controller agent 420 also instructs the access point manager 430 to modify the routing table of the local end guaranteed bandwidth router so as to route packets to the appropriate far end guaranteed bandwidth router on the appropriate channel. The route controller agent 420 furthermore instructs the access point manager 430 to modify the routing table of the local end guaranteed bandwidth router so as to route packets received from the far end guaranteed bandwidth router to the access server or the OGB server, depending on whether the architecture of FIG. 6 or FIG. 7 is used.

The access point manager 430 communicates only with the route controller agent 420 and the interface handlers 440 executing at the same access point. As noted above, the access point manager 430 keeps track of the available bandwidth on all local end guaranteed bandwidth routers that can be used for time-sensitive communications at the access point. The access point manager 430 provides such bandwidth information to the route controller agent 420 when requested. The access point manager 430 also maintains the IP and guaranteed bandwidth network addresses of all of the local end guaranteed bandwidth routers that it manages. The access point manages 430 also instructs, via the interface handlers 440, the appropriate local end guaranteed bandwidth router in updating its routing table to route packets in the desired manner described above.

The access point manager 430 does not interact directly with the guaranteed bandwidth routers because different kinds of guaranteed bandwidth routers may be provided which obey different control protocols. Instead, appropriate interface handlers 440 are provided for interfacing with each guaranteed bandwidth router. The interface handlers 440 are capable of causing their respective routers to establish a channel or connection, and to update their routing tables, when so instructed by the access point manager 430. Most routers offer telnet or SNMP-based management interfaces that provide these functions.

The route switch agent 410 is for modifying the routing tables so that the appropriate packets of the time-sensitive communication are transferred to the guaranteed bandwidth router and so that all other packets are transferred to the ordinary router. In FIG. 6, the route switch agent 410 executes in the OGB server 228 and modifies the routing table of the access server 222 or 242. In FIG. 7, the route switch agent 410 executing in the OGB server 328 modifies the routing table of the OGB server 328. In either case, the effect is to cause the packets originating at the local end host, and destined to the far end host, of the time-sensitive communication, to be transferred via the guaranteed bandwidth router 226 or 246 and to cause all other packets to be transferred via the ordinary router 224 or 244. Details of how this is achieved are discussed below.

Referring again to FIG. 6, a source node and a destination node may perform both time-sensitive and time-insensitive communications simultaneously or contemporaneously. For instance, the host 210 may desire to receive a streamed audio-video feed and to receive electronic mail (at no particular completion time) from the host 250 simultaneously. The audio-video feed is a time-sensitive communication whereas the electronic mail is time-insensitive. Illustratively, the invention provides for distinguishing between the two types of communications and for routing packets of the time-sensitive communication via the guaranteed bandwidth network 260 while routing packets of the time-insensitive communication via the WAN 230.

Illustratively, the header of the packet, in addition to indicating source and destination addresses, also contains an identifier which uniquely indicates the application of the source hosts to which it corresponds. Such an identifier, referred to as the "application port number," is included in transmission control protocol (TCP) and user datagram protocol (UDP) packets. Application port numbers are predefined identifiers which are assigned to specific applications from a central authority.

Consider the above example, where the OGB servers 228 and 248 establish a time-sensitive communication between the hosts 210 and 250. Assume that the host 210 is executing a particular application, which uses a corresponding application port number p1, when it communicates with an equivalent application executing on the host 250 (which also uses the application port number p1). Illustratively, the OGB server 228 modifies the routing table of the access server 222 so as to cause only those packets, originating at the node 210 and destined to the node 250 which also have the application port number p1, to be routed to the guaranteed bandwidth router 226. For example, suppose the routing table of the access server 222 is as shown below in Table 4:

TABLE 4

| Source/Destination Address | Next node |
|---|---|
| ... | ... |
| 'host 250' | 'router 224' |
| ... | ... |
| ... | ... |

Where 'host 250' is the IP address of the host 250 and 'router 224' is the appropriate indicator for routing packets to the router 224. After modification, the routing table of the access server is as shown in Table 5:

TABLE 5

| Source/Destination Address/Port Number | Next node |
|---|---|
| ... | ... |
| 'host 250' | 'router 224' |
| 'host 210, host 250, port p1' | 'router 226' |
| ... | ... | where 'host 210, host 250, port p1' is the combination of the IP addresses of the hosts 210 and 250 and the application port number p1 and where 'router 226' is the appropriate indication for routing packets to the router 226. Note that both the source and destination address, as well as the application port number are used to ensure that other packets originating from other hosts that are also destined to the host 250 are not routed to the router 226.

Assume that when the host 210 request the communication, the host 250 is executing an equivalent application, which also uses the application port number p1. In such a case, the OGB server 248 modifies the routing table of the access server 242 so as to cause only those packets, originating at the node 250 and destined to the node 210 which also have the application port number p1, to be routed to the guaranteed bandwidth router 246. All other communicated packets are routed by the access servers 222 and 242 via the WAN 230.

This principle can also be applied to the network architecture shown in FIG. 8. In FIG. 8, one host in each subnetwork executes the access point manager 430 (or, more appropriately, the subnet manager 430) and interface handler 440 procedures. For instance, suppose the host h3 in the subnetwork 11 and the host h7 in the subnetwork 12 execute the subnet manager 430 and interface handler 440 procedures. Each host h1-h3 and h7 executes the route controller agent 420 and route switch agent 410 procedures. Furthermore, each host h1-h3 and h7 maintains its own routing table. That is, each host uses a routing table stored thereat to determine to which of the two routers r21 and r16 (for subnetwork 11) or to which of the two routers r15 and r22 (for subnetwork 12) it should route its packets. Therefore, the route switch agent 410 modifies the routing table at the host in which it resides. Assume that the host h1, in the course of executing an application which uses application port number p5, wishes to establish a time-sensitive communication with an equivalent application, that also uses application port number p5, executing on the host h7. The route controller agent 420 in the host h1 negotiates with the route controller agent 420 in the host h7. Assume that the route controller agents 420 agree to the communication. The route switch agent 410 in the host h1 then modifies the routing table so as to only route packets originating at the host h1 and destined for the host h7 for the specific application port number p5 to the router r21. For instance, assume that prior to modification, the routing table at the host h1 is as follows:

TABLE 6

| Destination Address | Next Node |
|---|---|
| ... | ... |
| 'host h7' | 'router r16' |
| ... | ... |

In Table 6, 'host h7' is the IP address of host h7 and 'router r16' is an indication for routing packets with IP address 'host h7' to the router r16. After modification, the routing table is as shown in Table 7 below:

TABLE 7

| Destination Address/Port Number | Next Node |
|---|---|
| ... | ... |
| 'host h7' | 'router r16' |
| 'host h7, p5' | 'router r21' |
| ... | ... |

In Table 7, 'host h7, p5' is the combination of the IP address for the host h7 and the application port number p5 and 'router r21' is an indication for causing packets with the destination address h7 and application port number p5 to be routed to the router r21. As above, this permits the host h1 to transmit time-sensitive communication packets to the host h7 via the router r21 and switched network 175 and other packets to the host h7 via the router r16 and WAN 110.

Conclusion

An access point is provided with a first link to the Internet backbone on which packets are communicated using a best effort scheme at an uncontrollable, unpredictable and fluctuating rate. The access point also has a second link to a guaranteed bandwidth network on which the access point is able to, on demand, establish a continuous bandwidth channel with an arbitrary other access point. The first host can generate a packet requesting that the access point establish a continuous bandwidth session with a second host. In response, the access point transmits a packet via the first link and the wide area network to a second access point to which the second host is connected. The transmitted packet contains a request to set up a continuous bandwidth channel between the two access points, for communication between the two hosts. The access point, to which the first host is connected, and the second access point, to which the second host is connected, establish a continuous bandwidth channel via the second link and guaranteed bandwidth network. The access point, to which the first host is connected, communicates packets between the first and second hosts via the second link, i.e., receives packets destined to the first host from, or transmits packets originating from the first host to, the second link. Thus, the access point performs the preliminary negotiations with another access point via the Internet backbone. The two access points then set up a continuous bandwidth channel via a supplementary guaranteed bandwidth network which bypasses the Internet backbone. The present invention thus achieves the goal of end-to-end, guaranteed bandwidth communications, within a predictable time interval, for time-sensitive communications, such as streamed communications or communications which must be completed, end-to-end, within a certain time interval. Such communications are achieved while minimizing costs and administrative burdens.

Finally, the above discussion is intended to be merely illustrative of the invention. Those having ordinary skill in the art may devise numerous alternative embodiments without departing from the spirit and scope of the following claims.

The invention claimed is:

1. A communication network comprising
   a plurality of hosts including a source host and a destination host between which packets are to be transmitted,
   a wide area network over which said packets can be transmitted between said hosts using a best effort scheme,
   a guaranteed bandwidth network over which packets can be transmitted between said hosts at a continuous bandwidth and with assured quality of service, and
   an access point serving said source and destination hosts, each of said access points being a switching point where packets can either continue traveling over said wide area network or enter said guaranteed bandwidth network and comprising a first router for connecting said access point to said wide area network, a second router for connecting said access point to said guaranteed bandwidth network, an access server connected to communicate with one of said hosts, each of said first and second routers including a routing table, and server means for modifying said routing tables to determine whether said hosts between which packets are to be transmitted are to communicate over either a particular one or both of said wide area network and said guaranteed bandwidth network.

2. A communication network in accordance with claim 1 wherein said access point includes a bus to which each of said first router, said second router, said access server, and said server means are connected.

3. A communication network in accordance with claim 1 wherein said server means is connected between said access server and both of said first and second routers and all packets to be transmitted from a host are examined by said server means as they pass from said access server to one of said routers.

4. A communication network in accordance with claim 1 wherein said routing table utilizes the address of the source host, the address of the destination host, and an application port number of the source host to determine the communication of the packets between said source and destination hosts.

5. A communication network comprising a source host and a destination host, a wide area network and a guaranteed bandwidth network on which packets are communicated between said source and said destination hosts, a first router in communication with said guaranteed bandwidth network, a second router in communication with said wide area network, and an access server in communication with said first and second routers, said access server having a routing table which causes particular packets containing the destination address of said destination host and a particular application port number specifying a first application executing on said source host which originates said particular packets to be routed to said first router for transmission to said destination host via said guaranteed bandwidth network and which causes said packets other than said particular packets and containing said destination address to be routed to said second router for transmission to said destination host via said wide area network.

* * * * *